United States Patent
Bonkhoff et al.

(10) Patent No.: US 8,310,209 B2
(45) Date of Patent: Nov. 13, 2012

(54) BATTERY CHARGER AND METHOD FOR CHARGING A BATTERY

(75) Inventors: Ingolf Bonkhoff, Münster (DE); Aniu Liu, ShenZhen (CN)

(73) Assignee: Friwo Geratebau GmbH, Ostbevern (DE)

( * ) Notice: Subject to any disclaimer, the term of this patent is extended or adjusted under 35 U.S.C. 154(b) by 290 days.

(21) Appl. No.: 12/758,834

(22) Filed: Apr. 13, 2010

(65) Prior Publication Data
US 2010/0270979 A1  Oct. 28, 2010

(30) Foreign Application Priority Data
Apr. 22, 2009  (EP) .................................... 09005661

(51) Int. Cl.
*H01M 10/46* (2006.01)
(52) U.S. Cl. ...................................................... 320/141
(58) Field of Classification Search .................. 320/107, 320/139, 141, 150
See application file for complete search history.

(56) References Cited

U.S. PATENT DOCUMENTS
5,939,862 A  8/1999  Kates et al.
6,191,552 B1  2/2001  Kates et al.
7,227,337 B2  6/2007  Guang et al.
2004/0189252 A1*  9/2004  Berlureau et al. ............ 320/128
2007/0040516 A1*  2/2007  Chen ............................. 315/291
2008/0238370 A1*  10/2008  Carrier et al. ................. 320/134

FOREIGN PATENT DOCUMENTS
AU  683534 B  4/1996
WO  96/37941 A1  11/1996

OTHER PUBLICATIONS
EP09005661 Search Report, Aug. 28, 2009.
Office Action from The State Intellectual Property Office of the People's Republic of China for Application No. 201010154064.9 dated Apr. 27, 2012 (Original and Translation, 12 pages).

* cited by examiner

*Primary Examiner* — Edward Tso
(74) *Attorney, Agent, or Firm* — Michael Best & Friedrich LLP

(57) ABSTRACT

The present invention relates to a battery charger for charging a battery (10), said battery charger comprising an AC/DC power supply means (1), a pulse width modulation controlled DC/DC converter (2) and a control unit (3) that is connected to the AC/DC power supply means (1) and the PWM-controlled DC/DC converter (2). The battery charger has a maximum output power while avoiding to blow up small battery packs if the control unit (3) is adapted to measure at least a voltage and a current at terminals of the battery (10) to be charged, calculate a power at the battery (10), compare the calculated power and the nominal maximum power of the AC/DC power supply means (1), and transmit a signal to the PWM-controlled DC/DC converter (2) to adjust a charging current supplied to the battery (10) based on the comparison result. A temperature at the battery can also be measured.

6 Claims, 2 Drawing Sheets

BATTERY CHARGER AND METHOD FOR CHARGING A BATTERY

The present invention relates to a battery charger for charging a battery, said battery charger comprising an AC/DC power supply means, a pulse with modulation (PWM)-controlled DC/DC converter and a control unit that is connected to the AC/DC power supply means and the PWM-controlled DC/DC converter.

A battery charger may be designed according to two different options. According to a first option, a low cost design can be achieved, when a fixed number of battery cells are charged without considering potential failures or the efficiency of the charging process.

According to a second option, a highly sophisticated charge may be designed for a wide range of battery cells, when the cell package is specifically customized and has to identify itself using signals, in case of a specific charging parameter for different numbers of cells. Hence, Original Equipment Manufacturers or standard batteries are excluded from this application.

For the highly sophisticated type of battery design, the battery charger can only work with a lower efficiency in order to avoid damaging a small number of cells, while the large number of cells has to be charged with enough power.

FIG. 1 shows the main functions of a standard battery charger. Such a standard battery charger comprises an AC/DC power supply, which has the same function as in a standard power supply, namely to deliver the required energy and to fulfill safety requirements. It is connected to a charge management module, which is in turn directly connected to the battery to be charged. A feedback loop allows to provide a feedback from the battery to the charge management module.

Since the power consumption of the battery charger is not constant during the charging process, the AD/DC power supply cannot operate the whole time in the more efficient higher power stage. Typically, the charging process will start in a lower voltage range and requires more power once the battery increases the voltage level while charging.

A battery charger is known from U.S. Pat. No. 7,227,337 B2. The battery charger disclosed therein comprises a microprocessor having two functions. The microprocessor controls not only the charging properties of the battery charging circuit but also the power output of the battery charger by controlling the regulating circuit. The charging current, which is fed to the battery cells, is detected by the microprocessor, as well as the voltage at the cells, and, optionally, the cell temperature. The regulator is controlled by the microprocessor and the value of the total charging current, which is fed to the battery cells, is used, in order to determine a pulse width of the regulating circuit.

The microprocessor uses the output current of the regulator in order to control the duty cycle of the regulator. When the output current is larger than a predetermined threshold, the duty cycle is reduced, whereas, when the charging current is smaller than a predetermined value, the duty cycle is increased.

The battery charger disclosed in U.S. Pat. No. 7,227,337 B2 therefore comprises a charging control circuit which controls the charging process based on the current, and is designed to reach a voltage threshold defined in advance, before regulating retroactively the current. Its working principle relies on constant current constant voltage (CCCV) charging procedures, where, in a first phase, the battery is charged with a constant current, the value of which is limited by the battery charger to limit the initial charging current. Upon reaching the desired final voltage at the battery, a switch from a current-control mode to a voltage-control mode occurs and a second charging phase under constant voltage begins, so that, as the charge of the battery increases, the charging current decreases automatically. The publication U.S. Pat. No. 7,227,337 B2 discloses a common control of the charging and the DC/DC output by a common processor.

Hence, there is a need for a battery charger, which would be able to adapt relevant charging parameters in a dynamic way, so as to obtain the maximum power output from the battery charger, while avoiding blowing up small battery packs.

An object of the present invention is to provide a battery charger that has a maximum power output without blowing up small battery packs. Further, a corresponding method for charging a battery is also required. This object is solved by the subject matter of the independent claims. Preferred embodiments are subject matter to the dependent claims.

According to an embodiment of the invention, the control unit of the battery charger is adapted to measure at least a voltage and a current at terminals of the battery to be charged, calculate a power at the battery based on the measured voltage and current, compare the calculated power and the nominal maximum power of the AC/DC power supply means and transmit a signal to the pulse width modulation controlled DC/DC converter to adjust a charging current supplied to the battery based on the comparison result.

Such a battery charger provides the technical advantage that a maximum power can be output without damaging the battery cells, which allows the battery charger to operate at the most efficient point. Further, the charging time of a battery can be minimized and the battery charger is applicable to a wide range of standard cell packages. Finally, the life cycle of battery packages would be extended due to better charging factors, thereby avoiding battery waste.

According to a preferred embodiment of the invention, the control unit is further adapted to measure a voltage change and/or current change at the terminals of the battery, wherein the signal transmitted to the pulse width modulation controlled DC/DC converter contains information on the measure voltage change and/or current change.

According to a preferred embodiment of the invention, if the calculated power is smaller than the nominal maximum power of the AC/DC power supply means, the control unit is adapted to transmit a signal requesting the pulse width modulation controlled DC/DC converter to increase the charging current supplied to the battery, and if the calculated power is larger than the nominal maximum power of the AC/DC power supply means, the control unit is adapted to transmit a signal requesting the pulse width modulation controlled DC/DC converter to decrease the charging current supplied to the battery.

The reaction of the battery is thereby constantly detected, so that a power is supplied to the battery cells that is adapted to their need, thereby avoiding damage to the battery cells. Even when power is available on the primary side, the battery charger according to the invention will still operate with a reduced power, in order not to damage the battery cells.

According to an embodiment of the invention, the control unit is further adapted to measure a temperature of the battery and to transmit the measured temperature of the battery in the signal to the pulse width modulation controlled DC/DC converter to adjust a charging current supplied to the battery.

According to yet another preferred embodiment of the invention, the control unit is further adapted to measure a temperature change of the battery, wherein the signal transmitted to the pulse width modulation controlled DC/DC converter contains information on the measured temperature change of the battery.

Another embodiment of the invention provides a method for charging a battery, said method comprising connecting a control unit to an AC/DC power supply means and a pulse width modulation controlled DC/DC converter, measuring at least a voltage and a current at terminals of the battery to be charged, calculating a power of the battery based on the measured voltage and current, comparing the calculated power and the nominal maximum power of the AC/DC power supply means, and transmitting a signal to the pulse width modulation controlled DC/DC converter to adjust a charging current supplied to the battery based on the comparison result.

In the following, the battery charger and method for charging a battery according to the present invention will be described with respect to FIGS. 2 and 3.

Figure 1:
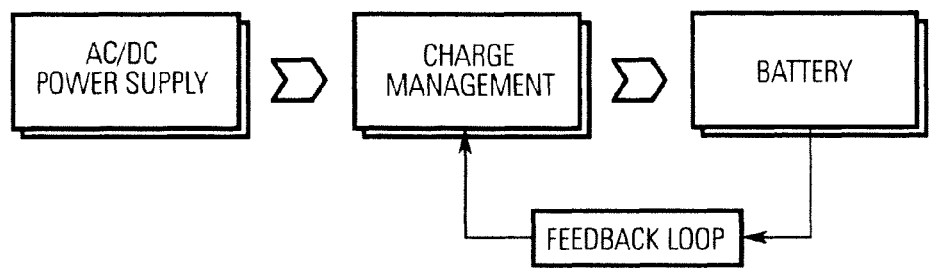
FIG. 1 shows the main functions of a standard battery charger.
Figure 2:
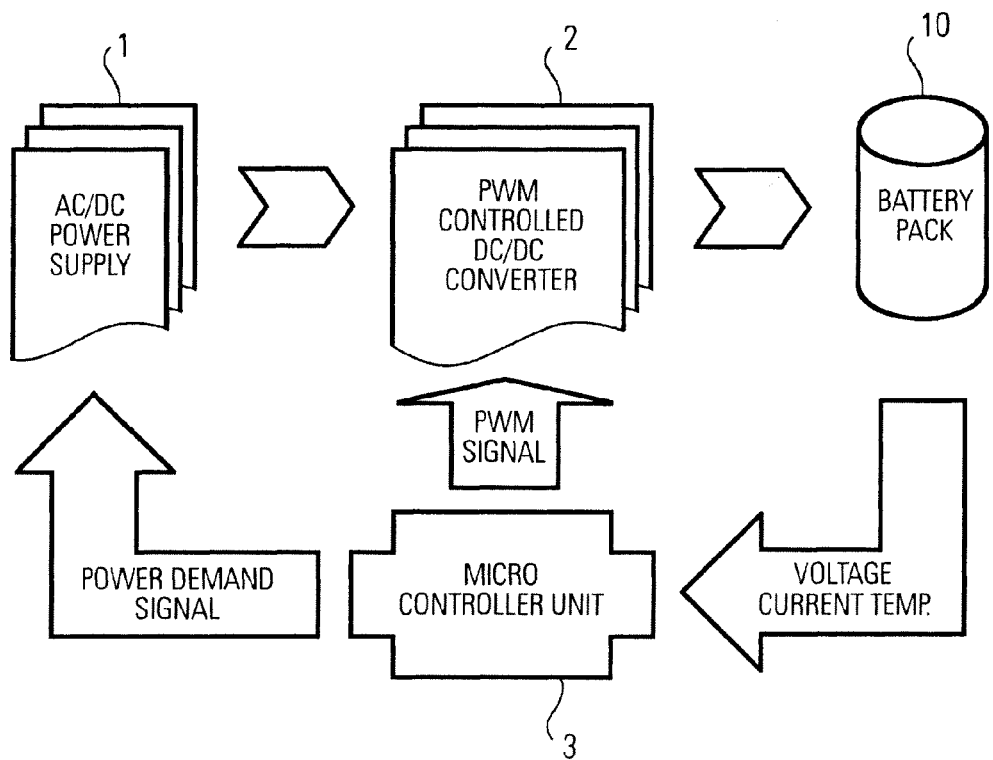
FIG. 2 shows the functional blocks of a battery charger according to an embodiment of the present invention.
Figure 3:
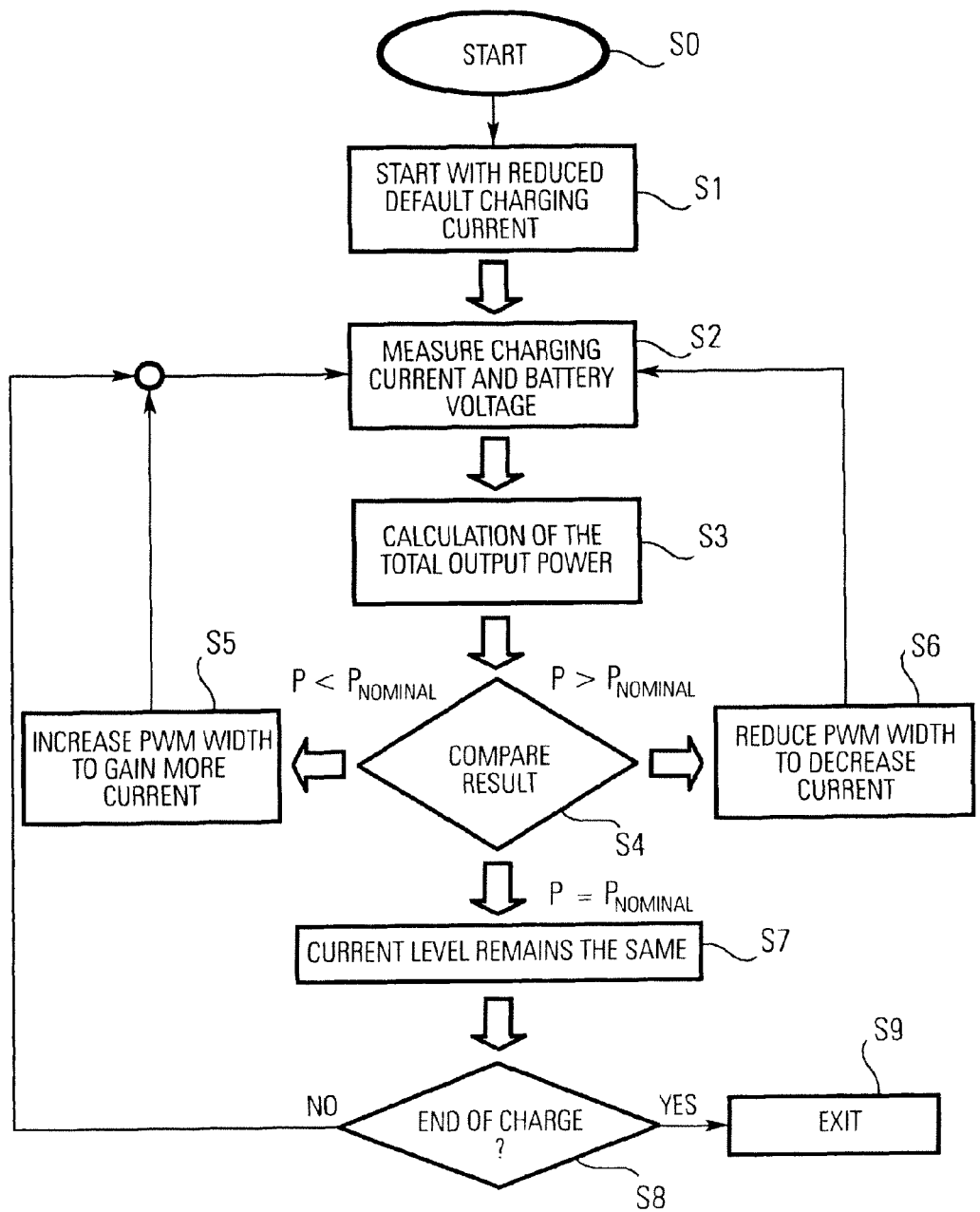
FIG. 3 shows a flow diagram illustrating the method for charging a battery according to an embodiment of the present invention.

FIG. 2 shows the functional blocks of a battery charger according to an embodiment of the present invention. It comprises an AC/DC power supply means 1 and a pulse width modulation (PWM)-controlled DC/DC converter 2 that are connected to each other. The PWM-controlled DC/DC converter 2 supplies a charging current to a battery 10.

A control unit 3 is connected to the AC/DC power supply means 1 and to the PWM-controlled DC/DC converter 2. According to the present invention, the control unit 3 measures a voltage across the terminals of the battery 10 and a current at the terminals of the battery 10. It then calculates a power at the battery 10 based on the measured voltage and current and compares the calculated power and the nominal maximum power of the AC/DC power supply means 1. The control unit 3 then transmits a signal to the PWM-controlled DC/DC converter 2 to adjust a charging current supplied to the battery 10 based on the comparison result.

Even though the control unit 3 has been described above as measuring a voltage across the terminals of the battery 10 and a current at the terminals of the battery 10, the invention is not limited thereto. Indeed, according to a preferred embodiment of the invention, the control unit 3 is further adapted to measure a voltage change and current change, i.e. the respective gradient of the voltage and current curves, and to transmit a signal to the PWM-controlled DC/DC converter 2 that contains information on a voltage change and current change. This allows a more rapid reaction, in case the battery is charged with an unsuitably high power.

According to a preferred embodiment of the invention, if the calculated power is smaller than the nominal maximum power of the AC/DC power supply means 1, the control unit 3 transmits a signal requesting the PWM-controlled DC/DC converter 2 to increase the charging current supplied to the battery 10. If the calculated power is larger than the nominal maximum power of the AC/DC power supply means 1, the control unit 3 transmits a signal requesting the PWM-controlled DC/DC converter 2 to decrease the charging current supplied to the battery 10.

The reaction of the battery is thereby constantly detected, so that a power is supplied to the battery cells that is adapted to their need, thereby avoiding damage to the battery cells. Even when power is available on the primary side, the battery charger according to the invention will still operate with a reduced power, in order not to damage the battery cells.

According to an embodiment of the invention, the control unit 3 is further adapted to measure a temperature of the battery 10 and to transmit the measured temperature of the battery 10 in the signal to the pulse width modulation controlled DC/DC converter 2 to adjust a charging current supplied to the battery 10.

According to a preferred embodiment of the present invention, the control unit 3 measures the temperature of the battery 10. This information on the temperature of the battery may be used by the control unit 3 to adjust the charging current that is supplied to the battery 10 by the PWM-controlled DC/DC converter 2.

According to yet another embodiment of the invention, the control unit 3 is adapted to measure a temperature change of the battery 10 and transmit a signal to the PWM-controlled DC/DC converter 2 which contains information on the measured temperature change.

In a battery charger according to an embodiment of the present invention, the charging current is controlled to equalize the power consumption in all stages of the battery charger.

Thus, it is possible to obtain a dynamic charging current. A wide range of battery cell packs, such as 2 to 12 cells of NiMH or NiCd battery packs or 1 to 5 Lithium cells, can be handled.

A microprocessor may be used for the task of an optimized charging current in all stages of the charging process. The charging behaviour and response of batteries is beside minor facts mostly depending on the chemistry, the age and especially on the charging and storing history of the battery. This has to be considered in the charge management in order to keep the system safe and stable. It is mandatory to supervise key parameters of the battery over the whole time.

Handling the voltage, the current and, optionally, the temperature information in a dynamic manner depending on the charging level and gaining out of these data the information of the right amount of power to be applied to the battery at each instant allows to create a function of "Auto Power Balancing".

In spite of the common use of micro processors in state of the art chargers on the market, the focus of the software is always on the recognition of the right moment to cut off the charging process once the battery reached full charged condition. A very stable and regulated charging current should make the sensing of small voltage deviations more easy. The current level is almost fixed to a specific minimum capacity of the applied batteries.

The battery charger according to the present invention comprises a PWM-controlled DC/DC converter, which is used to adjust the charging current in real time depending on the measured battery parameters. In case of a harmless battery response, the charge current will be increased as much as the specific battery can bear without getting into any abnormal condition. In the same time the supplying primary AC/DC stage will be driven in the higher and more efficient working point.

The control unit evaluates the battery voltage, the charging current, as well as the temperature of the battery pack in case there is a NTC detected. The further data processing is done by the control unit automatically to calculate the required output power. The result of this calculation is compared with the nominal maximum power of the AC/DC part. If there is still some spare energy available, the control unit adjusts the PWM-controlled DC/DC converter in order to reach the maximum output power while considering the battery response.

The method for charging a battery according to an embodiment of the invention is described with respect to FIG. 3, which will be explained in detail in the following.

The method starts with step S0 and goes to step S1, where a reduced default charging current is supplied by the PWM-controlled DC/DC converter 2 to the battery 10.

In step S2, a charging current and battery voltage are measured at the terminals of the battery. Based on the measured voltage and current, a total output power is calculated in step S3. The calculated power is then compared to the nominal maximum output power of the AC/DC power supply means 1 in step S4.

In case the measured power is smaller than the nominal maximum power of the AC/DC power supply means 1, the PWM width is increased in step S5 in order to increase the charging current supplied to the battery 10. The flow then goes back to step S2, where the charging current and battery voltage at the terminals of the battery 10 are measured again. The steps S3 and S4 are then executed.

In case the measured power is larger than the nominal maximum power of the AC/DC power supply means 1 (step S4), the PWM width is reduced in step S6, in order to decrease the charging current supplied to the battery 10. The process then goes back to step S2, where the charging current and voltage at the terminals of the battery are measured, before executing steps S3 and S4.

In case the calculated power is equal to the nominal maximum power of the AC/DC power supply means 1 (step S4), the process goes to step S7, i.e. the current level is not amended but remains the same. The process then goes to step S8, where it is checked whether the charging procedure has come to an end. If not, the method goes back to step S2 and the steps S3 and S4 are executed again. In case the charging process has come to an end, the method proceeds to step S9, that is the end of the charging process.

The evolution of the voltage at the battery is monitored during the charging procedure. While the charging level of the battery increases, the differential resistance of the battery increases and the voltage at the battery increases. Upon reaching full charge, the energy fed to the battery cannot be chemically bound and the battery heats up. While the battery heats up, the differential resistance decreases, the charging voltage drops. This constitutes a $-\Delta U$ charging procedure. The charging procedure comes to an end when the charging voltage falls upon reaching the maximum voltage, or upon reaching the maximum of the charging voltage (peak voltage detection).

The core idea of the present invention is the automatic balancing of the power fed on the primary side as a function of the number of battery cells, the temperature reaction as well as the voltage reaction of the battery cells. This allows the battery charger to adapt the charging curve in order to protect the battery cells from an overload in the charging procedure, while guaranteeing an optimal charging process. This includes increasing but also reducing the energy to be provided according to the necessities of the battery cells. The $-\Delta U$ threshold for detecting a fully charged battery cell, in case no temperature sensor is present, is also dynamic and will be adapted to the corresponding voltage threshold automatically.

The invention claimed is:
1. A battery charger for charging a battery, said battery charger comprising:
an AC/DC power supply means,
a pulse width modulation controlled DC/DC converter,
a control unit that is connected to the AC/DC power supply means and the pulse width modulation controlled DC/DC converter, wherein said control unit is adapted to
measure at least a voltage and a current at terminals of the battery to be charged,
calculate a power at the battery based on the measured voltage and current,
compare the calculated power and the nominal maximum power of the AC/DC power supply means, and
transmit a signal to the pulse width modulation controlled DC/DC converter to adjust a charging current supplied to the battery based on the comparison result,
wherein the control unit is further adapted to measure a temperature of the battery and to transmit the measured temperature of the battery in the signal to the pulse width modulation controlled DC/DC converter to adjust the charging current supplied to the battery.

2. The battery charger according to claim 1, wherein the control unit is further adapted to measure a voltage change and/or current change at the terminals of the battery, wherein the signal transmitted to the pulse width modulation controlled DC/DC converter contains information on the measure voltage change and/or current change.

3. The battery charger according to claim 1, wherein transmitted signal is a pulse width modulation signal.

4. The battery charger according to claim 1, wherein the control unit is adapted to transmit a signal requesting the pulse width modulation controlled DC/DC converter to increase the charging current supplied to the battery if the calculated power is smaller than the nominal maximum power of the AC/DC power supply means, and to transmit a signal requesting the pulse width modulation controlled DC/DC converter to decrease the charging current supplied to the battery if the calculated power is larger than the nominal maximum power of the AC/DC power supply means.

5. The battery charger according to claim 1, wherein the control unit is further adapted to measure a temperature change of the battery, wherein the signal transmitted to the pulse width modulation controlled DC/DC converter contains information on the measured temperature change of the battery.

6. A method for charging a battery, said method comprising the following steps:
connecting a control unit to an AC/DC power supply means and a pulse width modulation controlled DC/DC converter,
measuring at least a voltage and a current at terminals of the battery to be charged,
calculating a power at the battery based on the measured voltage and current,
comparing the calculated power and the nominal maximum power of the AC/DC power supply means, and
transmitting a signal to the pulse width modulation controlled DC/DC converter to adjust a charging current supplied to the battery based on the comparison result,
wherein the control unit further measures a temperature of the battery and transmits the measured temperature of the battery in the signal to the pulse width modulation controlled DC/DC converter to adjust the charging current supplied to the battery.

* * * * *